United States Patent Office 3,536,564
Patented Oct. 27, 1970

3,536,564
PROCESS FOR PREPARING A
COMPOSITE ARTICLE
Walter M. Duffy, Wallingford, Pa., assignor to E. I. du Pont de Nemours and Company, Wilmington, Del., a corporation of Delaware
No Drawing. Continuation-in-part of application Ser. No. 534,403, Mar. 15, 1966. This application Feb. 28, 1967, Ser. No. 619,186
Int. Cl. B32b 31/00
U.S. Cl. 156—293                               9 Claims

ABSTRACT OF THE DISCLOSURE

An open-cell polyurethane foam, low-density nonwoven fabric or the like is impregnated with a liquid polyurethane, and the resulting composite structure is interposed between two solid articles (e.g., a windshield and the matching part of a car body); then the liquid polyurethane is cured in situ to form an elastomer and to bond the articles resiliently and sealingly together.

This is a continuation-in-part of my application Ser. No. 534,403 filed on Mar. 15, 196, now abandoned.

This invention relates to a process for preparing composite articles and to the articles prepared by this process. An especially useful embodiment of the invention concerns a process for resiliently and sealingly bonding an automobile windshield to the steel windshield-receiving member of an automobile body.

In a broad sense, the process of the present invention comprises (a) Providing a layer of open-cell polyurethane foam whose cells are substantially completely filled with a liquid polyurethane composition adapted for conversion in situ to a solid (non-liquid and non-foam) resilient polyurethane polymer, (b) Placing the layer resulting from step (a) in contact with at least one body of solid material (e.g., a shaped article of metal or glass) and (c) While maintaining intimate contact between said layer and said body, subjecting said liquid polyurethane composition to reaction conditions sufficient to convert it in situ to a solid resilient polyurethane polymer, the resulting polyurethane foam containing layer of solid resilient polyurethane polymer being integrally bonded to said body.

In preferred embodiments of the novel process, the liquid polyurethane-filled foam layer resulting from step (a) is placed in interposed contact with at least two bodies of solid material (A and B), and the polyurethane foam-containing layer of solid resilient polyurethane polymer formed in step (c) is integrally bonded to both of said bodies in interposed relation therewith.

In another aspect of the present invention the polyurethane foam is replaced with another suitable porous material having the resilience needed for the particular application and capable of being impregnated with enough of the liquid polyurethane composition so that (1) when the liquid polyurethane impregnated porous layer is placed in interposed contact with at least two bodies of solid material and (2) the liquid polyurethane is converted in situ to a solid polyurethane elastomer, the solid bodies are resiliently and sealingly bonded to each other. Included among such other porous materials are strips and sheets of open-cell foams or open-cell structures of other synthetic polymers (e.g., polyethylene and elastomers of the type commonly used in open-cell "rug underlay" materials and the like), cellulose sponge, woven and nonwoven fabrics and cords, and bulky elastic yarns. In certain embodiments of the invention, the porous material is a nonwoven fabric which (a) is made of synthetic fibers, e.g. polyester fibers, and (b) has a density of less than 3, preferably less than 1.5, pounds per cubic foot. The invention will be described in further detail with particular emphasis on the usually-preferred polyurethane foam.

The composite article of the present invention, in a broad sense, comprises a body of solid material, and in adherent contact with said body a layer of open-cell polyurethane foam whose cells are substantially completely filled with solid resilient polyurethane polymer.

In preferred embodiments of the invention, the composite article comprises at least two bodies of solid material (A and B), and in interposed adherent contact with said bodies a layer of open-cell polyurethane foam (or other suitable porous material) whose cells or pores are substantially completely filled with a solid resilient polyurethane polymer.

The open-cell polyurethane foam used in the present invention preferably has good resilience and elasticity, a skeletal structure and a density of about 1.5 to 3 pounds per cubic foot. Such a foam can be prepared according to procedures described in U.S. Pats. 3,025,200, 3,171,820 and 3,210,300, the disclosures of which are incorporated herein by reference. As explained in these patents, a foam having a "skeletal" or "reticulated" structure is characterized by the substantial absence of cell membranes. Such a foam is more easily impregnated with the liquid polyurethane composition than the conventional so-called "open-cell" polyurethane foams having a substantial amount of cell membranes present.

As shown in U.S. Pat. 3,171,820, a substantial proportion of the cell membranes can be removed from a conventional membrane-containing open-cell polyurethane foam by chemical means. Other known types of open-cell polyurethane foams can also be used in the present invention. Useful open-cell polyurethane foams of the non-skeletal type can be prepared as described in U.S. Pat. 3,190,842, column 1, line 66 to column 3, line 14. The polyurethane foams generally the most useful in the present invention have about 10 to 100 cells per linear inch. If the cells are too large, the liquid polyurethane composition tends to flow out of the foam before it can be solidified; if the cells are too small, it is difficult to impregnate the foam with the preferred liquid polyurethane compositions.

The cells of the polyurethane foam are completely or almost completely filled with the liquid polyurethane composition. When the foam has a weight ratio of liquid polyurethane/foam of at least about 90/10 it is considered "almost completely" or "substantially completely" filled with liquid polyurethane according to the spirit of the present invention. Methods known in the art to be useful for impregnating porous structures with liquid polymeric compositions can be employed for introducing the liquid polyurethane into the foam structure. One useful impregnation method comprises (1) passing a long strip of the foam over a guide roll into a vessel filled with the liquid polyurethane, (2) passing the strip of foam between at least one pair of squeeze rolls mounted within the liquid polyurethane and (3) passing the impregnated foam strip out of the vessel over a guide roll and onto a conveyor belt adapted to carry it to the plant location where it is to be used. Another useful impregnation method comprises (1) placing a sheet of the foam in a shallow container filled with the liquid polyurethane to a depth slightly greater than the foam thickness, (2) working a hand roller or spatula back and forth across the foam sheet a few times with enough pressure to obtain substantially complete impregnation and (3) removing the impregnated foam sheet and allowing any excess polyurethane to drain from the surface.

The impregnated polyurethane foam preferably has a weight ratio of liquid polyurethane composition (nonvolatile components) to polyurethane foam of about 90:10 to 98:2. A ratio greater than 98:2 is usually not attainable unless a considerable excess of the liquid composition is allowed to remain on the foam surface because of the practical minimum density of the foam structure. A ratio of less than 90:10 is usually not desirable in laminating applications requiring high bond strength and a bonding layer highly impervious to dust and fluids.

The liquid polyurethane composition must be capable of being converted to a substantially solid, resilient polyurethane polymer (or "elastomer") while within the cells of the polyurethane foam. The liquid composition can consist essentially of (a) an isocyanate-terminated polyurethane capable of reacting with water vapor in the air to form a solid elastomer, or (b) a mixture of an isocyanate-terminated polyurethane and a compound having a plurality of groups bearing active H atoms which groups are capable of reacting with the isocyanate groups to form a solid elastomer. Among the useful active hydrogen-containing compounds are low molecular weight polyols, organic diamines and mixtures thereof. Such liquid compositions are well known in the art; a skilled polyurethane chemist will have no difficulty in selecting a liquid polyurethane composition suitable for use in the present invention after reading the present disclosure. Catalysts, coloring agents, viscosity-controlling agents, stabilizers, adhesion-enhancing agents and other additives known to be useful in liquid polyurethane compositions can be added to the liquid composition.

The isocyanate-terminated polyurethanes can be prepared by agitating a molar excess of an organic diisocyanate with a polyalkyleneether glycol, a polyalkyleneetherthioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. It is to be understood that mixtures of the foregoing polyols may be employed, if desired.

The content of nonvolatile components in the liquid polyurethane composition is preferably about 98 to 100%; however, useful results are sometimes obtained with a nonvolatile content as low as about 85%, for example in applications where the resulting reduction in viscosity causes no serious workability problems.

A liquid polyurethane composition is selected which has a viscosity low enough to permit impregnation of the polyurethane foam, but high enough so that substantially all of the liquid composition introduced into the foam cells remains there until it is solidified. The liquid polyurethane has a surprisingly strong tendency to remain within the cells of the polyurethane foam until it is solidified even when the liquid composition has a relatively low viscosity. This provides a definite advantage over many known polyurethane caulking compositions which tend to exhibit undue flow prior to solidification even when made from very viscous liquid polyurethanes. The lower viscosity polyurethanes which can be used in the present invention result in a better bond and seal on many articles because of more effective wetting of the surfaces to be bonded and filling of any pores therein.

The best viscosity for particular applications depends to a large extent on the cell size of the foam; and of course the liquid composition can be warmed just prior to use to reduce its viscosity when the resulting reduction in pot life can be tolerated. The preferred Brookfield viscosity at 25° C. of the liquid composition usually falls within the range of about 1800 to 3800 poises.

The liquid polyurethane-filled foam layer is placed in contact with at least one body of solid material to which it will become integrally bonded upon conversion of the liquid polyurethane to a substantially solid polyurethane elastomer. The body of solid material can be a sheet, rod, tube or other shaped article of glass, metal, wood, plastic, leather, concrete, ceramic or other material to which the solidified polyurethane will adhere. The adhesion of the polyurethane-filled foam layer to the solid body can be enhanced by known methods for preparing surfaces for bonding or coating operations; for example, the surface of the solid body can be cleaned, scrubbed with an abrasive, treated with a chemical that modifies the surface, and/or coated with known adhesion-promoting primers or coating compositions. Also, the adhesion can sometimes be enhanced by adding a known adhesion-promoting material (e.g., an organic silicon-containing compound) to the liquid polyurethane composition.

The liquid polyurethane-filled foam layer is kept in intimate contact with the solid body (or bodies) while the liquid polyurethane composition is allowed to undergo the in situ solidification reaction which converts it to a substantially solid elastomer. The assembly can be placed under moderate pressure during the solidification reaction if desired; however, good bonds are usually obtained when no pressure is applied to the assembly.

When the impregnated foam has been applied to only one solid body, a three-layer composite article can be prepared according to the present invention by coating the resulting polyurethane foam-containing layer of solid polyurethane elastomer on the exposed side with a layer of the above-described liquid polyurethane composition, placing another solid body in contact with the liquid polyurethane layer, and solidifying the liquid polyurethane as described above whereby the polyurethane foam-containing layer of solid resilient polyurethane polymer is integrally bonded to both of the solid bodies in interposed relation therewith. This procedure is useful, for example, in applications where it is impractical to have the second solid body in contact with the liquid polyurethane-filled foam layer during the in situ solidification reaction.

Preferred embodiments of the invention comprise placing the liquid polyurethane-filled foam layer in interposed contact with two or more solid bodies to which it will become integrally bonded upon the in situ conversion of the liquid polyurethane to a solid polyurethane elastomer.

As will be apparent to one skilled in the polyurethane art, the time it takes to convert the liquid polyurethane composition to a solid resilient polyurethane polymer (sometimes referred to as "cure rate") will depend on such factors as ambient temperature and humidity, the nature of the isocyanate end groups, and the amount and type of any active hydrogen-containing compound or catalyst that may be present in the liquid composition. Satisfactory cure rates are often attainable at an ambient temperature about 20 to 30° C.

The process of the present invention is especially useful for providing a resilient and fluid-impervious bond between the windshield of an automobile and the steel windshield-receiving member of the automobile body. This can be accomplished by placing a strip of the liquid polyurethane-filled foam layer in interposed contact with the entire periphery of the windshield surface and said windshield-receiving member, and keeping the layers of the assembly in intimate contact with each other until the liquid polyurethane has solidified and the windshield has become integrally bonded to the steel member. A bond of satisfactory strength, resilience and imperviousness to water, air and dust can be obtained in this manner even when the periphery of the windshield does not have exactly the same configuration as that of the steel member. Thus, the resilient bonding layer effectively seals the gap between the windshield and the steel member despite variations in the size of the gap and despite the presence of imperfections such as pits or bumps in the surfaces to be bonded.

The process of this invention is also useful for such purposes as:

(1) Forming a durable, resilient polyurethane weatherstrip integrally bonded to the door of an automobile or building;

(2) Forming a vibration and shock-absorbing layer of resilient polyurethane integrally bonded to the bottom of a delicate or sensitive instrument or apparatus;

(3) Forming a fluid-impervious resilient polyurethane gasket integrally bonded to a moving or stationary part of various devices;

(4) Providing a shork-absorbing, resilient, fluid and dust-impervious bond between various shaped articles of glass, metal, wood and other solid materials, including articles having surface imperfections and poorly matched surfaces;

(5) Filling crevices and forming expansion/contraction joints in buildings, electrical equipment, roads, machinery and the like with an adherent, resilient, fluid-impervious structure, for example merely by fitting a piece of the liquid polyurethane-filled foam into the crevice and allowing the liquid polyurethane composition to become solidified and integrally bonded to the sides of the crevice.

The examples which follow are given for the purpose of illustrating the invention. All quantities shown are on a weight basis unless otherwise indicated.

EXAMPLE I

An automobile windshield made of ¼-inch thick safety glass is resiliently and sealingly bonded to the steel windshield-receiving member of an automobile body as follows.

A resilient bonding layer is prepared by impregnating a strip of open-cell polyurethane foam with a liquid polyurethane composition. The polyurethane foam contains about 45 cells per lineal inch, is resilient and elastic, has a skeletal structure and a density of 1.8 pounds per cubic foot; it is prepared substantially in accordance with the procedure described in U.S. Pat. 3,025,200, Example 7.

The polyurethane foam is impregnated with a liquid polyurethane composition prepared by (a) charging a reaction vessel (equipped with stirrer, thermometer, reflux condenser and nitrogen inlet) with 3110 parts polypropylene glycol (molecular weight 2000), 650 parts petroleum naphtha, 180 parts carbon black and 3080 parts finely divided calcium carbonate; (b) stirring the contents of the vessel while heating to reflux temperature and continuing to stir at this temperature for two hours; (c) removing all of the petroleum naphtha along with any water present in the vessel by distillation; (d) cooling the mixture to 90° C.; (e) adding 780 parts of 4,4'-diphenylmethane diisocyanate and stirring the mixture for 5 minutes; (f) adding 0.25 part stannous octoate and stirring the mixture at 100° C. for 45 minutes and (g) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture at 100° C. for two hours. The resulting liquid polyurethane composition has a content of nonvolatile components of about 100% and a Brookfield viscosity at 25° C. of 2185 poises.

A 20-foot-long strip of the polyurethane foam measuring ¼-inch wide and ¼-inch thick is (1) passed over a guide roll into a vessel filled with the liquid polyurethane composition at 25° C., (2) passed between a pair of squeeze rolls mounted within the vessel of liquid polyuretha, (3) passed from the vessel over a guide roll and onto a wire mesh conveyor belt. The resulting impregnated polyurethane foam has a weight ratio of liquid polyurethane composition to polyurethane foam of 9.68:3.2.

The cells of the polyurethane foam are substantially completely filled with the liquid composition.

The peripheral portion of the windshield surface which will be in contact with the bonding layer is prepared in advance of the impregnation operation by (a) washing it with a mild detergent solution in warm water, rinsing it with clean water, wiping it with a clean cloth dampened with ethanol and drying it; (b) wiping it with a clean cheese cloth wet with an adhesion-enhancing primer consisting of a 2% solution in ethanol of N,N'-bis(hydroxyethyl-gamma-amino-propyl-triethoxy silane); and (c) allowing the primer to dry for 15 minutes at 25° C.

The portion of the windshield-receiving member which will be in contact with the bonding layer is prepared before the foam impregnation by (1) applying a zinc phosphate coating ("Bonderite" 100), (2) spraying on a 0.001-inch thick coat (dry film thickness) of a primer having the composition given under Formula A below and baking it for 30 minutes at 196° C., (3) spraying on a 0.025-inch thick coat (dry film thickness) of a known automobile enamel (as described in Example 10 of U.S. Pat. 2,934,509) and baking it for 30 minutes at 135° C., and (4) brushing on a coat of a primer having the composition given under Formula B below and allowing it to dry for 15 minutes at 25° C.

FORMULA A

| | Parts |
|---|---|
| Alkyd resin solution | 18.0 |
| Urea formaldehyde resin, 60% solution in butanol | 2.0 |
| Iron oxide | 11.5 |
| Aluminum silicate | 9.0 |
| Barytes | 28.8 |
| Aromatic solvent, B.P. 190–210° C. | 16.0 |
| Aliphatic solvent, B.P. 190–250° C. | 14.7 |
| | 100.0 |

In Formula A, the alkyd resin is a 40% oil-length dehydrated castor oil modified glyceryl-ethylene glycol phthalate alkyd resin having an acid number of about 8 and a content of unesterified hydroxyl groups equivalent to 4.1% glycerol; this resin is added as a 55% solution in xylene having a Gardner-Holdt viscosity of Y.

FORMULA B

| | Parts |
|---|---|
| Methylmethacrylate hydroxyaminopropyl resin made as described in Example 1 of U.S. Pat. No. 2,949,445, added as a 30% solution in a 56/44 blend of toluene and isopropanol | 45.0 |
| Polymethylmethacrylate, 40% solution in a 33/67 blend of acetone and toluene | 5.5 |
| Acrylic resin/carbon black dispersion [1] | 12.3 |
| Xylene | 30.1 |
| Cellosolve acetate | 0.3 |
| Butyl benzyl phthalate | 6.8 |
| | 100.0 |

[1] Prepared by mixing 35 parts xylene, 50 parts polymethyl methacrylate, 10 parts carbon black, grinding the mixture thoroughly in a ball mill and adding 5 parts xylene.

The bonding operation is completed by (1) placing the strip of impregnated polyurethane foam described above in contact with the primed periphery of the windshield and fitting the strip to cover the entire periphery, (2) mounting the resulting assembly in place on the steel windshield-receiving member so that the impregnated foam strip is in interposed contact with the entire periphery of the windshield and the steel member, (3) keeping the layers of the assembly in intimate contact with each other while the liquid polyurethane composition is solidified in situ by allowing the assembly to stand for 24 hours at an ambient temperature of 30° C. and a relative humidity of 71% whereby the liquid polyurethane reacts with the moisture in the atmosphere and is converted to a solid polyurethane elastomer. The strength of the bond continues to increase (i.e., the bond continues to cure) for the next few days as the assembly stands at ordinary ambient temperature and humidity (e.g., 25° C. and 50% relative humidity).

The windshield is now integrally bonded to the steel member. The bond has satisfactory strength, resilience and imperviousness to fluids and dust when the automobile is subjected to normal use conditions.

EXAMPLE II

Example I is repeated except in preparing the liquid polyurethane composition the 4,4'-diphenylmethane diisocyanate is replaced with an equal number of moles of bis(2-isocyanatoethyl fumarate). When fully cured, the resulting resilient bond between the windshield and the steel member has outstanding retention of bond strength on extended outdoor exposure.

EXAMPLE III

A lap joint is prepared as follows for testing strength and elongation properties of a bond obtained between glass and steel articles in accordance with the invention:

(a) A sheet of plate glass having a thickness of ¼ inch, a width of 1 inch and a length of 4 inches is cleaned and primed on one side as the windshield was in Example I.

(b) A sheet of auto body steel having a thickness of 1/16 inch, a width of 1 inch and a length of 4 inches is zinc phosphate coated, primed and painted on one side as the steel member was in Example I.

(c) The glass sheet is placed primed-side-up on a bench top and the metal sheet is placed painted-side-down so that part of it is in superposed contact with the glass sheet and so that there is a ½-inch end-to-end overlap of the two sheets.

(d) A resilient bonding layer measuring 1 inch long, ¼ inch wide and ¼ inch thick is prepared as described in Example I except the impregnated foam has a weight ratio of liquid polyurethane composition to polyurethane foam of 95.4:5.6.

(e) The impregnated foam strip is placed in interposed contact with the overlapped portions of the two sheets so that one edge of the foam strip lies in the same vertical plane as the overlapped end of the metal sheet.

(f) The layers of the assembly are kept in intimate contact with each other while the liquid polyurethane composition is solidified in situ by allowing the assembly to stand for 24 hours at 38° C. and 100% relative humidity.

The resulting lap joint is tested on an Instron tensile test machine at a chart speed of 10 inches per minute and a crosshead speed of 1 inch per minute using a full scale load of 100 pounds on the "D" cell. The direction of force is parallel to the longest side of the test assembly. The bond has a lap shear value of 39 pounds and an elongation at break of 368%.

Substantially the same results are obtained when Example III is repeated except the polyurethane composition is solidfied by allowing the assembly to stand for 7 days at 25° C. and 50% relative humidity.

EXAMPLE IV

Six different lap joints are prepared and tested by repeating Example III except:

(a) The polyurethane foam has 100 cells per lineal inch.

(b) The bonding layer has a width and thickness of ⅜ inch.

(c) The impregnated foam for each assembly has a liquid polyurethane:foam ratio (L:F ratio) as shown in Table I.

The lap shear values (pounds) and elongation values are shown in Table I.

TABLE I

| Assembly No. | L:F ratio | Lap shear | Elongation, percent |
|---|---|---|---|
| 4.1 | 91.3:8.7 | 33 | 144 |
| 4.2 | 93.0:7.0 | 40 | 179 |
| 4.3 | 94.3:5.7 | 55 | 192 |
| 4.4 | 94.6:5.4 | 59 | 202 |
| 4.5 | 95.8:4.2 | 69 | 280 |
| 4.6 | 96.3:3.7 | 76 | 296 |

EXAMPLE V

Example III is repeated except (a) The metal and glass sheets measure 4 inches square.

(b) The liquid polyurethane:polyurethane foam ratio is 95.2:4.8.

(c) The bonding layer has a length of 4 inches so as to extend from side-to-side of the assembly.

(d) The bond withstands 370,000 cycles with no apparent damage when tested on a known type of vibration tester wherein one end of the assembly is clamped in a stationary position and the other end is attached to the cam-activated vibrator which vibrates the bond at 300 cycles per minute with a back and forth movement of 0.015 inch in a direction parallel to the longest side of the test assembly.

(e) The ¼ inch by 4 inch bond has a lap shear value of 140 pounds and an elongation at break of 292%.

EXAMPLE VI

Example III is repeated except:

The bonding layer provided in step (d) is prepared as described in Example I with the exception that the strip of polyurethane foam is replaced with a nonwoven fabric of sheath/core composite polyester fibers made by (1) spinning continuous polyester filaments having a core of poly[ethyleneterephthalate] (melting point about 255° C.) surrounded by a sheath of poly-[ethylene terephthalate/isophthalate (80/20)] copolymer (melting point about 205° C.), the sheath/core weight ratio being 15/85; (2) drawing the filaments in a hot water bath at 95° C. and then passing them over a pair of heated rollers at 125° C. without changing their length; (3) crimping the drawn filaments by means of a conventional stufferbox crimper so that they have about 12 crimps per inch; (4) relaxing the filaments by passing them through a heat zone at 120° C. for 5 minutes after which the denier of the filaments is 4.7 and the denier of the core is 4.0; (5) cutting the filaments into fibers having an average length of about 2 inches; (6) relaxing the fibers in a heat zone at 185° C. for 15 minutes; (7) forming the fibers into a web by means of a carding machines (garnet), the fibers of the web being in criss-cross relation with one another; (8) passing the web through a 220° C. heat zone wherein the fibers are bonded to one another at points of intersecting contact with each other by fusion of the sheath while the web is compressed under a woven-wire screen to a thickness of one inch; (9) cooling the resulting nonwoven fabric to 22° C., the fabric now haivng a density of 0.45 pound per cubic foot; and (10) cutting the fabric into strips of suitable size for the bonding operation, these strips being one inch long, ½-inch wide and ¼-inch thick.

Also, in step (f), the polyurethane composition is solidified in situ by allowing the assembly to stand for 7 days at 25° and 50% relative humidity.

When tested as described in Example III, the bond has a lap shear value of 108 p.s.i. and an elongation at break of 367%.

I claim:

1. A process for preparing a composite article which comprises
   (a) providing a layer of open-cell polyurethane foam whose cells are substantially completely filled with a liquid polyurethane composition adapted for conversion in situ to a solid resilient polyurethane polymer, (b) placing the layer resulting from step (a) in contact with at least one body of solid material and (c) while maintaining intimate contact between said layer and said body, subjecting said liquid polyurethane composition to reaction conditions sufficient to convert it in situ to a solid resilient polyurethane ploymer, the resulting polyurethane foam-containing layer of solid resilient polyurethane polymer being integrally bonded to said body.

2. A process according to claim 1 wherein the liquid polyurethane-filled foam layer resulting from step (a) is placed in interposed contact with at least two bodies of solid material (A and B), and the polyurethane foam-containing layer of solid resilient polyurethane polymer formed in step (c) is integrally bonded to both of said bodies in interposed relation therewith.

3. A process according to claim 2 wherein body (A) is an automobile windshield and body (B) is the steel windshield-receiving member of an automobile body, and the liquid polyurethane-filled foam layer is in the form of a narrow strip placed in interposed contact with the periphery of the windshield and said steel member.

4. A process according to claim 2 wherein said polyurethane foam is resilient and elastic and has a skeletal structure and a density of about 1.5 to 3 pounds per cubic foot.

5. A process according to claim 4 wherein the weight ratio of liquid polyurethane to polyurethane foam in the layer resulting from step (a) is about 90:10 to 98:2.

6. A process according to claim 4 wherein said liquid polyurethane composition has a Brookfield viscosity at 25° C. of about 1800 to 3800 and a content of nonvolatile components of about 98 to 100%.

7. A process according to claim 4 wherein said bodies are composed of a material selected from the group consisting of glass, metal, wood, plastic, leather and cement compositions.

8. A process for preparing a composite article which comprises (a) providing a layer of porous open-cell material whose cells are substantially completely filled with a liquid polyurethane composition adapted for conversion in situ to a solid resilient polyurethane polymer, (b) placing the layer resulting from step (a) in interposed contact with at least two bodies of solid material, and (c) while maintaining intimate contact between said layer and said bodies, subjecting said liquid polyurethane composition to reaction conditions sufficient to convert it in situ to a solid resilient polyurethane polymer, the resulting porous material-containing layer of solid resilient polyurethane polymer being integrally bonded to both of said bodies in interposed relation therewith.

9. A process according to claim 8 wherein the layer of porous material employed in step (a) is a synthetic fiber nonwoven fabric having a density of less than 3 pounds per cubic foot.

References Cited
UNITED STATES PATENTS

| | | |
|---|---|---|
| 2,888,360 | 5/1959 | Sherts et al. |
| 2,903,380 | 9/1959 | Hoppe et al. |
| 2,955,056 | 10/1060 | Knox. |
| 3,219,516 | 11/1965 | Cobbledick _____ 156—293 X |

REUBEN EPSTEIN, Primary Examiner

U.S. Cl. X.R.

111—190; 156—331